United States Patent [19]

Shimomura

[11] Patent Number: 4,587,273

[45] Date of Patent: May 6, 1986

[54] METHOD FOR MANUFACTURING FLAME-RETARDANT POLYURETHANE FOAM

[75] Inventor: Kenji Shimomura, Yokohama, Japan

[73] Assignee: Ikeda Bussan Co., Ltd., Tokyo, Japan

[21] Appl. No.: 764,841

[22] Filed: Aug. 9, 1985

[30] Foreign Application Priority Data

Aug. 11, 1984 [JP] Japan .............................. 59-168482

[51] Int. Cl.$^4$ ............................................. C08G 18/14
[52] U.S. Cl. .................................... 521/107; 521/123; 521/906
[58] Field of Search ......................... 521/107, 123, 906

[56] References Cited

U.S. PATENT DOCUMENTS

| | | | |
|---|---|---|---|
| 3,833,386 | 9/1974 | Wood et al. | 521/123 |
| 4,263,411 | 4/1981 | Bak | 521/123 |
| 4,362,626 | 12/1982 | Takeuchi et al. | 521/123 |

*Primary Examiner*—Maurice J. Welsh

*Attorney, Agent, or Firm*—Pearne, Gordon, Sessions, McCoy, Granger & Tilberry

[57] ABSTRACT

Disclosed is a method for manufacturing a flame-retardant polyurethane foam which comprises the steps of:

mixing a polyether polyol, an organic polyisocyanate, water, a surfactant, a catalyst containing a metal and a tertiary amine catalyst to form a mixture; and reacting the mixture to form a polyurethane foam, the improvement wherein 1 to 15 parts by weight of a triarylphosphate and 1 to 15 parts by weight of a complex salt consisting of a sintered mixture comprising silico-zirconate and antimony oxide are added to said mixture based on 100 parts by weight of said polyether polyol, respectively.

The method for manufacturing a flame-retardant polyurethane foam of this invention generates no poisonous gas at manufacturing process and the resultant polyurethane foam has excellent flame retardant characteristics and causes no corrosion of a surface material thereof.

18 Claims, No Drawings

METHOD FOR MANUFACTURING FLAME-RETARDANT POLYURETHANE FOAM

BACKGROUND OF THE INVENTION

This invention relates to a method for manufacturing a flame-retardant polyurethane foam, more particularly to a method for manufacturing a flame-retardant polyurethane foam which generates no poisonous gas at its preparing process and causes no corrosion of a surface material, a material to be adhered and the like, and when the method is employed for flame laminates, a cured product having excellent flame retardant and adhesion characteristics could be obtained.

Heretofore, a flame-retardant polyurethane foam has been used in many fields such as cushion materials of automobiles, beds, sofas and the like and other fields. These polyurethane foams have been employed in many kinds of uses such as for general-purpose blowing, integral blowing, high-frequency wave welder, flame laminate, general-purpose slub urethane or the like.

As a method for manufacturing this kind of the flame-retardant polyurethane foam, there have been known a method which employs, as a flame retarder, an inorganic compound such as a boron compound, aluminum hydroxide, antimony trioxide or the like and is carried out by reacting the starting materials by the one-step method or the prepolymer method; a method which is carried out by the same manner as mentioned above except for using a halogen compound such as polychloroparaffin as a flame retarder; and a method which is carried out by the same manner as mentioned above except for using a halogen-containing phosphate such as tris(chloroethyl)phosphate, tris(2,3-dichloropropyl)phosphate and the like as a flame retarder.

However, in the method of employing the inorganic compound as a flame retarder, it is not suitable for the flame laminate processing, etc. since the inorganic compounds accelerate carbanization of the polyurethane foam. Further it has an problem that it is necessary to select an inorganic compound appropriately because the inorganic compound reacts with a catalyst for blowing so that the desired polyurethane foam could not be obtained.

On the other hand, in the case of a manufacturing method using the halogen compound or the halogen-containing phosphate as a flame retarder, when preparing a polyurethane foam, the methods have a problem that they generate poisonous hydrogen halide gas as evaporates or cracked gas because the temperature of the blowing process becomes high, i.e. 100° C. or more. Further, after manufacturing, since the prepared polyurethane foam release a hydrogen halide gas gradually, the generated hydrogen halide made the surface material colored or physical properties of the polyurethane foam lowered, whereby there is a problem in the point of durability. Moreover, when the above polyurethane foam is used as the polyurethane foam for a high-frequency wave welder or a flame laminate, there are problems that a hydrogen halide gas is generated because of heat treatment at the manufacturing process to cause difficulty in operation as well as to corrode a material to be adhered.

SUMMARY OF THE INVENTION

An object of this invention is to overcome the aforesaid problems and to provide a method for manufacturing a flame-retardant polyurethane foam which generates no poisonous gas such as a hydrogen halide at manufacturing process, and when the method is employed for flame laminates, etc., a cured product having excellent flame retardant and adhesion characteristics could be obtained.

That is to say, the method for manufacturing the flame-retardant polyurethane foam of this invention comprises the steps of:

mixing a polyether polyol, an organic polyisocyanate, water, a surfactant, a catalyst containing a metal and a tertiary amine catalyst to form a mixture; and reacting said mixture to form a polyurethane foam, the improvement wherein 1 to 15 parts by weight of a triarylphosphate and 1 to 15 parts by weight of a complex salt consisting of a sintered mixture comprising silico-zirconate and antimony oxide are added to said mixture based on 100 parts by weight of said polyether polyol, respectively.

DESCRIPTION OF THE PREFERRED EMBODIMENTS

In the following, this invention will be explained in more detail.

In this invention, the triarylphosphate to be used as a flame retarder is a compound represented by the following formula:

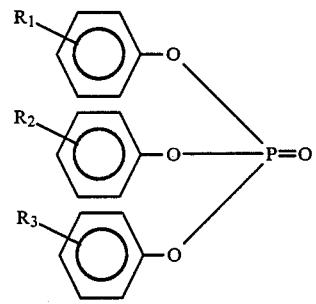

wherein $R_1$, $R_2$ and $R_3$ each may be the same or different, and each represents a hydrogen atom or an alkyl group.

In the above formula, examples of the alkyl group represented by $R_1$, $R_2$ or $R_3$ may preferably include a lower alkyl group having 1 to 4 carbon atoms such as methyl group, an ethyl group, an n-propyl group, an iso-propyl group, an n-butyl group, an iso-butyl group, a tert-butyl group and the like. Of these aklyl groups, an iso-propyl group is particularly preferable since a polyurethane foam having excellent flame retardant characteristics and physical properties can be obtained.

An amount of the above triarylphosphate is in the range of 1 to 15 parts by weight, preferably 1 to 10 parts by weight based on the 100 parts by weight of the polyether polyol. If the amount of the triarylphosphate to be formulated is less than 1 part by weight, sufficient effect as the flame retarder can not be obtained. On the other hand, if it exceeds 15 parts by weight, flame retardant effect in proportion to the compounding amount can not be obtained sufficiently and many independent bubbles will generate in the polyurethane foam so that the final product shrinks.

Concrete examples of the triarylphosphate may include triphenylphosphate, tri(p-methylphenyl)phosphate, diisopropylmonophenylphosphate, monoisopropyldiphenylphosphate, and the like.

The complex salt consisting of a sintered mixture comprising silico-zirconate and antimony oxide to be formulated as the other component of the flame retarder can be obtained by heating and sintering the mixture of the silico-zirconate and antimony oxide at 650° C. to 1100° C. Examples of the silico-zirconate may include a calcium silico-zirconate, magnesium silico-zirconate, strontium silico-zirconate, barium silico-zirconate, potassium silico-zirconate and the like, and the salts of the Group IIa elements in the Periodic Table are particularly preferred. As the antimony oxide, it may preferably be used an antimony trioxide.

An amount of the aforesaid complex salt is 1 to 15 parts by weight, preferably 1 to 12 parts by weight based on the polyether polyol. If the amount of the complex salt is less than 1 part by weight, flame retardant effect is low. On the other hand, if it exceeds 15 parts by weight, the lowering in strength such as tear off strength of the prepared foam will be caused.

The polyether polyol to be used in this invention is preferred that it has 2 to 4 hydroxyl groups and has a molecular weight of 1,000 to 10,000. The polyether polyol is used in the form of liquid or by liquifying or melting it at a manufacturing process in a polyurethane blowing device and the like.

Examples of the polyether polyol may include a linear and/or branched polyether having plural numbers of ether bondings and at least two hydroxyl groups, and contain substantially no functional group than the hydroxyl groups as disclosed in Japanese Provisional Patent Publication No. 179218/1982 and Japanese Patent Application No. 221274/1983. Concrete examples of the polyether polyol may include polyoxyalkylene polyol such as polyethylene glycol, polypropylene glycol, polybutylene glycol and the like. Further, a homopolymer and a copolymer of the polyoxyalkylene polyols may also be employed. Particularly preferable copolymers of the polyoxyalkylene polyols may include an adduct at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(hydroxyphenyl)propane, triethanolamine, triisopropanolamine, ethylenediamine and ethanolamine; with at least one compound selected from the group consisting of ethylene oxide, propylene oxide and butylene oxide. A linear and/or branched copolymerized ether of ethylene oxide and propylene oxide are available for the method for manufacturing polyurethane foam of this invention. In this invention, it is preferred to use a polyoxyalkylene copolymer having primary hydroxyl group sealed their terminal ends with ethylene oxides and having a molecular weight of 2,000 to 5,000.

Examples of the organic polyisocyanate to be used in this invention may include alkylene diisocyanates such as ethylene diisocyanate, trimethylene diisocyanate, hexamethylene diisocyanate, butylene-1,2-diisocyanate, etc.; cycloalkylene diisocyanates such as cyclopentylene-1,3-diisocyanate, cyclohexylene-1,3-diisocyanate, etc.; aromatic diisocyanates such as m-phenylene diisocyanate, p-phenylene diisocyanate, 2,4-tolylene diisocyanate, 2,6-tolylene diisocyanate, naphthalene-1,4-diisocyanate, etc.; and aliphatic-aromatic diisocyanates such as xylylene-1,4-diisocyanate, bis(4-isocyanatophenyl)methane, etc.

An amount of the organic polyisocyanate is preferable, in terms of NCO amount in the polyisocyanate, in the range of about 0.70 to about 1.35 moles based on the total active hydrogen of the polyether polyol, crosslinking agent and other compounds having active hydrogen atom.

Water is a component to be formulated as a blowing agent, and an amount thereof in the range of about 1.5 to about 5 parts by weight based on 100 parts by weight of the polyether polyol is preferable.

When a soft foam having low density would be desired, a fluorocarbon series blowing agent may be added thereto. Examples of the fluorocarbon series blowing agents may include trichloromonofluoromethane, dichlorofluoromethane, bromotrifluoromethane, 1,1-difluoro-1,2,2-trichloroethane, 1-chloro-1-fluoroethane, 1,1,1-trichloro-2,2,2-trifluoroethane and the like. The fluorocarbon series blowing agent may preferably be added in an amount of about 25 parts by weight or less based on 100 parts by weight of the polyether polyol.

The surfactant to be used in this invention is a component having functions of forming a desired cell to the polyurethane foam and allowing an elongation of the cell. These surfactants may include, for example, L-520 (trade name, available from NIPPON UNICAR Co., Ltd.), SRX-294A (trade name, available from Toray Silicone Co., Ltd.), SH-194 (trade name, available from Toray Silicone Co., Ltd.), L-5740-M (trade name, available from NIPPON UNICAR Co., Ltd.), F-242-T (trade name, available from Shin Etsu Silicone Co., Ltd.) and the like. An amount of the surfactant may preferably be about 0.5 to about 2.0 parts by weight based on 100 parts by weight of the polyether polyol.

The catalyst containing a metal to be used in this invention is a component to be formulated as a reacting catalyst of the polyether polyol and the polyisocyanate, and they may be employed one well known in the art as described in Japanese Provisional Patent Publication No. 179218/1982. Examples of the catalysts containing a metal may include a tertiary phosphine such as trialkylphosphine, dialkylbenzylphosphine, etc.; a strong base such as an alkali metal, an alkali metal hydroxide, etc.; an acidic metal salt of a strong acid such as ferric chloride, stannic chloride, stannous chloride, antimony trichloride, bismuth nitride, etc.; a metallic chelate compound obtained by acetyl acetone, ethylacetoacetate and the like with various metals such as Be, Hg, Zn, Cd, Pb, Ti, Zr, Sn, Bi, Cr, Mo, Mn, Fe, Co, Ni, etc.; an alkoholate or a phenolate represented by Ti(OR)$_4$, Sn(OR)$_4$, Sn(OR)$_2$, Al(OR)$_3$, etc. (wherein R represents an alkyl group or an aryl group); an organic acid salt of an alkaline metal, an alkaline earth metal or a metal of Al, Sn, Pb, Mn, Co, Ni, Cu, etc. such as sodium acetate, potassium laurate, stannous acetate, lead octate, manganese naphthenate, cobalt naphthenate, etc.; an organic metal derivative such as stannate, arsenite, arsenate, antimony (III), antimony (V), etc.; a dialkylstannite or stannate of a carboxylic acid such as diacetyldibutylstannate, dilauryldibutylstannate, dibutylstannous-4-methylaminobenzoate, etc.; and a trialkylstannous hydroxide, a dialkylstannous oxide, a dialkylstannous dialkoxide and dichlorodialkylstannate such as trimethylstannous hydroxide, dioctylstannous oxide, dibutylstannous-bis-(iso-propoxide), dichlorodibutylstannate, etc. Among these metallic salt catalysts, the divalent tin salt of the carboxylic acid having 2 to 18 carbon atoms are particularly preferable. An amount of the above catalyst to be formulated is preferably about 0.1 to about 0.9 part by weight based on 100 parts by weight of the polyether polyol.

In this invention, the tertiary amine catalyst is further formulated as a co-catalyst of the catalyst containing a metal. Concerete examples of the tertiary amine catalyst may include the compounds as disclosed in Japanese Provisional Patent Publication No. 179218/1982 such as triethylenediamine, triphenylamine, N,N,N',N'-tetramethyl-1,3-butanediamine, N-methylmorpholine, N-acetylmorpholine, N-octylmorpholine, N-phenylmorpholine, N-hydroxyethylmorpholine, trimethylaminoethylpiperazine, trimethylamine, triethanolamine, 1,2,4-trimethylpiperazine, N-methyldicyclohexylamine and the like, and one or more of the amines selected from the group consisting of the above may be employed.

An amount of the aforesaid tertiary amine catalyst to be formulated is preferably 0.05 to 3.2 parts by weight based on the 100 parts by weight of the polyether polyol.

In this invention, components well known in the art, additives and the like as disclosed in Japanese Provisional Patent Publication No. 172918/1982 can be formulated in addition to the aforesaid components. They may include, for example, a barium salt or cadmium salt of a carboxylic acid, clay, talc, $TiO_2$, silicon dioxide and hydrate thereof, calcium carbonate, a metallic chromate, baryte, a phthalocyanine pigment, a colored pigment, oxidized hematite, a stabilizer, a carbon black, a dye, a toner, an epoxydized soybean oil, an epoxide (e.g. Epon 828, trade name), tricresol phosphate, an antioxidant, a germicide and others, and they may be added in the manufacturing process of the polyurethane foam. These components may optionally be formulated in order to provide desired properties to the produced flame-retardant polyurethane foam.

According to the method for manufacturing the flame-retardant polyurethane foam of this invention, there is no generation of the poisonous gas such as hydrogen halide, etc. at a manufacturing process and when the method is employed for flame laminates, a cured product having excellent flame retardant and adhesion characteristics could be obtained. Further, the produced polyurethane foam releases no hydrogen halide so that it does not cause a deterioration or discoloration of a surface material thereof or polyurethane foam itself. In addition, the produced polyurethane foam has excellent flame retardant and adhesion characteristics.

In the following, this invention will be explained in more detail in accordance with the Examples, but it is not intended to limit this invention. In the Examples, all parts represent parts by weight.

EXAMPLE

One hundred parts of a polyether polyol (Highflex 303, trade name, available from Daiichi Kogyo Seiyaku K.K.) having an average molecular weight of about 3,000, 0.18 part of stannate octoate (T-9, trade name, available from Yoshitomi Seiyaku K.K.), 1.4 parts of a silicone oil (L-520, trade name, available from NIPPON UNICAR K.K.), 10 parts of triaryl phosphate (monoisopropyldiphenylphosphate) and 8 parts of a complex salt consisting of sintered mixture of powdery silicon zirconate and antimony trioxide (weight ratio 6:4) were mixed and then stirred. To the mixture were added 4.0 parts of water and 0.08 part of triethylenediamine as a tertiary amine catalyst, and then further 47.2 parts of tolylene diisocyanate (TDI 80, trade name, available from Mitsui Toatsu Kagaku K.K.) and 5 parts of "Freon®" 11 (trade name, available from Mitsui Dupont Fluoro Chemical's Co., Ltd.) were simultaneously added thereto while stirring. The thus prepared starting material for blowing was introduced into a mold for blowing having a mold temperature of 40° C. at the time when the reaction starts. After an upper cover of the mold was put down to close, the mixture was blowed and cured at 150° C. for 13 minutes to obtain the flame-retardant polyurethane foam according to this invention.

Then, the thus obtained flame-retardant polyurethane foam and PVC (polyvinyl chloride) skin were blowed at the same conditions as mentioned above Example except for the temperature of the skin at room temperature to prepare an integrally blowed PVC skin.

Each of the aforesaid flame-retardant polyurethane foam alone and the integrally blowed PVC skin was placed in a vessel, respectively, and the vessel was sealed. After heated at 100° C. for 200 hours, the coloring degree before and after experiments were measured in accordance with JIS Z-8730-1970, respectively. The results are shown in Table 1.

COMPARATIVE EXAMPLE 1

Polyurethane foams were prepared in the same manner as in Example except that tris(chloroethyl)phosphate (a halogen-containing compound) or antimony trioxide (an inorganic compound) was employed as a flame retarder, respectively.

With regard to these polyurethane foams, integrally blowed PVC skins were prepared in the same manner as in Example, repsectively. Then, concerning the thus prepared each PVC skin and the polyurethane foam alone, the heat-resistance test was carried out in the same conditions as in Example. The results are shown in Table 1 together with the results of Example. Further, comparative date concerning physical properties of the each foam are shown in Table 2.

TABLE 1

| | Color difference | |
|---|---|---|
| Flame retarder | Polyurethane foam alone | Integrally blowed PVC skin |
| This invention | 1.0 | 1.2 |
| Halogen containing-compound | 12.0 | 12.5 |
| Inorganic compound | 1.2 | 1.5 |

TABLE 2

| Flame retarder | This invention | Halogen-containing compound | Inorganic compound |
|---|---|---|---|
| Specific gravity | 0.018 | 0.020 | 0.021 |
| Tensile strength [kg/cm$^2$] | 1.0 | 1.1 | 0.9 |
| Elongation percentage [%] | 190 | 190 | 170 |
| Tear strength [kg/cm] | 0.76 | 0.75 | 0.50 |
| Compressive permanent set [%] | 4.0 | 4.1 | 5.4 |
| Repulsion elasticity [%] | 34 | 33 | 30 |
| Flame laminate adhesion strength [kg/25 mm] | 0.36 | 0.34 | 0.10 |

As clearly be seen from Table 1, it is confirmed that the flame-retardant polyurethane foam obtained by this invention is extremely less in degree of color change as compared with the polyurethane foam which is employed the halogen-containing compound as a flame retarder. Further, as cleary be seen from Table 2, the polyurethane foam obtained by this invention is less in deterioration of the physical properties as compared with the polyurethane foam which is employed the inorganic compound as a flame retarder.

By using a raw material for blowing having the same composition as in the above-mentioned Example, a flame-retardant polyurethane foam of this invention was obtained in the same manner as in Example. To this polyurethane foam was fixed a hook of Hotchkiss (trade name, available from Max Co., Ltd.), and after it was allowed to stand at 100° C. for 200 hours, checked a state of rust on the Hotchkiss hook. The result is shown in Table 3. Incidentally, Comparative examples were also checked in the same manner as mentioned above and the results are also shown in Table 3.

TABLE 3

| Flame retarder | State of metal surface |
| --- | --- |
| This invention | not corrode |
| Halogen-containing compound | rust was occured remarkably |
| Not added | not corrode |

As clearly be seen from Table 3, it is confirmed that the flame-retardant polyurethane foam obtained by this invention generates no rust on metal surfaces and accordingly it is not to corrode inserted metal materials such as iron which was integrally blowed.

Further, as to each of the previously prepared polyurethane foams, an adhesion strength after high-frequency wave welder treatment was measured, respectively. Moreover, surface conditions of each polyurethane foam after high-frequency wave welder treatment were observed with eyes. The results are also shown in Table 4.

TABLE 4

| Flame retarder | Welder adhesive strength [kg/cm] | Heat deterioration |
| --- | --- | --- |
| This invention | 0.32 | none |
| Halogen-containing compound | 0.28 | remarkably deteriorated |
| Not added | 0.34 | none |

As clearly be seen from the results in Table 4, it is confirmed that the flame-retardant polyurethane foam according to this invention has a good adhesive strength and shows no heat deterioration when it was carried out a high-frequency wave welder adhesion.

I claim:

1. A method for manufacturing a flame-retardant polyurethane foam comprising the steps of:
   mixing a polyether polyol, an organic polyisocyanate, water, a surfactant, a catalyst containing a metal and a tertiary amine catalyst to form a mixture; and reacting said mixture to form a polyurethane foam, the improvement wherein 1 to 15 parts by weight of a triarylphosphate and 1 to 15 parts by weight of a complex salt consisting of a sintered mixture comprising silico-zirconate and antimony oxide are added to said mixture based on 100 parts by weight of said polyether polyol, respectively.

2. The method for manufacturing a flame-retardant polyurethane foam according to claim 1, wherein a reaction is carried out by the one-step method or the prepolymer method.

3. The method for manufacturing a flame-retardant polyurethane foam according to claim 1, wherein said triarylphosphate is a compound represented by the following formula:

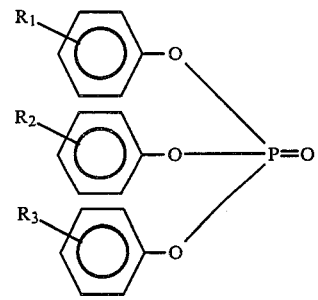

wherein $R_1$, $R_2$ and $R_3$ may be the same or different, and each represents a hydrogen atom or an alkyl group.

4. The method for manufacturing a flame-retardant polyurethane foam according to claim 3, wherein said triarylphosphate is selected from the group consisting of triphenylphosphate, tri(p-methylphenyl)phosphate, diisopropylmonophenylphosphate and monoiso-propyl-diphenylphosphate.

5. The method for manufacturing a flame-retardant polyurethane foam according to claim 3, wherein an amount of said triarylphosphate is 1 to 10 parts by weight based on 100 parts by weight of said polyether polyol.

6. The method for manufacturing a flame-retardant polyurethane foam according to claim 1, wherein said complex salt consisting of a sintered mixture comprising silico-zirconate and antimony oxide is prepared by sintering the mixture of the silico-zirconate and antimony oxide at 650° C. to 1100° C.

7. The method for manufacturing a flame-retardant polyurethane foam according to claim 6, wherein said silico-zirconate is selected from the group consisting of calcium silico-zirconate, magnesium silico-zirconate, strontium silico-zirconate, barium silico-zirconate and potassium silico-zirconate.

8. The method for manufacturing a flame-retardant polyurethane foam according to claim 6, wherein said antimony oxide is an antimony trioxide.

9. The method for manufacturing a flame-retardant polyurethane foam according to claim 6, wherein an amount of said complex salt is 1 to 12 parts by weight based on 100 parts by weight of said polyether polyol.

10. The method for manufacturing a flame-retardant polyurethane foam according to claim 1, wherein said polyether polyol is a compound having 2 to 4 hydroxyl groups and molecular weight of 1,000 to 10,000.

11. The method for manufacturing a flame-retardant polyurethane foam according to claim 10, wherein said polyether polyol is selected from the group consisting of polyethylene glycol, polypropylene glycol, polybutylene glycol; and copolymers of the polyoxyalkylene polyol composed of at least one compound selected from the group consisting of ethylene glycol, propylene glycol, diethylene glycol, dipropylene glycol, triethylene glycol, 2-ethylhexanediol-1,3, glycerin, 1,2,6-hexane triol, trimethylol propane, trimethylol ethane, tris(-hydroxyphenyl)propane, triethanolamine, triisopropanolamine, ethylenediamine and ethanolamine, with at least one compound selected from the group consisting of ethylene oxide, propylene oxide and butylene oxide.

12. The method for manufacturing a flame-retardant polyurethane foam according to claim 1, wherein said diisocyanate is selected from the group consisting of an alkylene diisocyanate of ethylene diisocyanate, trimethylene diisocyanate, hexamethylene diisocyanate and butylene-1,2-diisocyanate; a cycloalkylene diisocyanate of cyclopentylene-1,3-diisocyanate and cyclohexylene-1,3-diisocyanate; an aromatic diisocyanate of m-phenylene diisocyanate, p-phenylene diisocyanate, 2,4-tolylene diisocyanate, 2,6-tolylene diisocyanate and naphthalene-1,4-diisocyanate; and an aliphatic-aromatic diisocyanate of xylylene-1,4-diisocyanate and bis(4-isocyanatophenyl)-methane.

13. The method for manufacturing a flame-retardant polyurethane foam according to claim 12, wherein said diisocyanate is added, in terms of NCO amount in the polyisocyanate, in the range of about 0.70 to about 1.35 moles based on the total active hydrogen of the polyether polyol, cross-linking agent and other compounds having active hydrogen atom.

14. The method for manufacturing a flame-retardant polyurethane foam according to claim 1, wherein an amount of water is in the range of about 1.5 to about 5 parts by weight based on 100 parts by weight of the polyether polyol.

15. The method for manufacturing a flame-retardant polyurethane foam according to claim 1, wherein said metallic salt catalyst is a divalent tin salt of a carboxylic acid having 2 to 18 carbon atoms.

16. The method for manufacturing a flame-retardant polyurethane foam according to claim 15, wherein an amount of said metallic salt catalyst is about 0.1 to about 0.9 part by weight based on 100 parts by weight of the polyether polyol.

17. The method for manufacturing a flame-retardant polyurethane foam according to claim 1, wherein said tertiary amine catalyst is selected from the group consisting of triethylenediamine, triphenylamine, N,N,N',N'-tetramethyl-1,3-butanediamine, N-methylmorpholine, N-acetylmorpholine, N-octylmorpholine, N-phenylmorpholine, N-hydroxyethylmorpholine, trimethylaminoethylpiperazine, trimethylamine, triethanolamine, 1,2,4-trimethylpiperazine and N-methyldicyclohexylamine.

18. The method for manufacturing a flame-retardant polyurethane foam according to claim 17, wherein an amount of said tertiary amine catalyst is 0.05 to 3.2 parts by weight based on the 100 parts by weight of the polyether polyol.

* * * * *